(12) United States Patent
Clucas

(10) Patent No.: US 11,014,237 B2
(45) Date of Patent: May 25, 2021

(54) METHODS, SYSTEMS, AND APPARATUSES, FOR PATH PLANNING AND EXECUTION IN A ROBOTIC SYSTEM

(71) Applicant: INTELLIGRATED HEADQUARTERS, LLC, Mason, OH (US)

(72) Inventor: Dominic George Clucas, Saint Peters, MO (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 63 days.

(21) Appl. No.: 16/508,718

(22) Filed: Jul. 11, 2019

(65) Prior Publication Data

US 2021/0008720 A1 Jan. 14, 2021

(51) Int. Cl.
*B25J 9/16* (2006.01)

(52) U.S. Cl.
CPC ........... *B25J 9/1664* (2013.01); *B25J 9/1692* (2013.01)

(58) Field of Classification Search
CPC .............................. B25J 9/1664; B25J 9/1692
USPC .................................................. 700/245–264
See application file for complete search history.

(56) References Cited

U.S. PATENT DOCUMENTS

| | | | |
|---|---|---|---|
| 3,748,563 A * | 7/1973 | Pomella | G05B 19/4103 318/573 |
| 4,851,748 A * | 7/1989 | Daggett | G05B 19/4141 318/568.2 |
| 6,493,607 B1 | 12/2002 | Bourne et al. | |
| 8,706,300 B2 * | 4/2014 | Krause | B25J 9/1664 700/259 |
| 9,278,449 B1 * | 3/2016 | Linnell | B25J 9/1674 |
| 10,335,947 B1 * | 7/2019 | Diankov | B25J 15/0019 |
| 10,456,915 B1 * | 10/2019 | Diankov | B25J 9/1697 |
| 10,499,995 B2 * | 12/2019 | Ferreira | G01L 5/0057 |
| 10,556,347 B2 * | 2/2020 | Akeel | B25J 9/1697 |
| 2006/0178775 A1 * | 8/2006 | Zhang | B25J 13/02 700/245 |
| 2006/0184272 A1 * | 8/2006 | Okazaki | B25J 9/1697 700/245 |
| 2014/0074289 A1 * | 3/2014 | Xiao | B25J 9/163 700/254 |
| 2014/0142754 A1 * | 5/2014 | Dai | B25J 9/16 700/245 |
| 2014/0371905 A1 * | 12/2014 | Eberst | G06F 30/20 700/253 |

(Continued)

*Primary Examiner* — Jaime Figueroa
(74) *Attorney, Agent, or Firm* — Alston & Bird LLP

(57) ABSTRACT

A robotic manipulator has a robotic controller that includes a programmable logic controller (PLC). The PLC can be configured to receive a planned motion path having a first path segment and an abort segment. The first path segment can be associated with a path to be followed by a joint of the robotic manipulator and is queued before the abort segment associated with the first path segment. The abort segment can be indicative of a path segment that in response to execution results in aborting an operation of the joint of the robotic manipulator. The PLC can be configured to validate the planned motion path based on an analysis of at least the first path segment and the abort segment. Further, upon successful validation of the planned motion path, the PLC can be configured to initiate execution of the first path segment by the joint of the robotic manipulator.

20 Claims, 6 Drawing Sheets

(56) References Cited

U.S. PATENT DOCUMENTS

| | | | |
|---|---|---|---|
| 2016/0243704 A1* | 8/2016 | Vakanski | B25J 9/1697 |
| 2017/0357006 A1 | 12/2017 | Ohrlund et al. | |
| 2018/0164775 A1 | 6/2018 | Crivella et al. | |
| 2018/0173242 A1 | 6/2018 | Lalonde et al. | |
| 2019/0126474 A1* | 5/2019 | Skogsrud | G05B 13/04 |
| 2019/0299409 A1* | 10/2019 | Hazan | B25J 9/1692 |

* cited by examiner

METHODS, SYSTEMS, AND APPARATUSES, FOR PATH PLANNING AND EXECUTION IN A ROBOTIC SYSTEM

TECHNOLOGICAL FIELD

Example embodiments described herein relate generally to a robotic system, and, more particularly, to techniques for path planning and execution of a robotic tool of the robotic system.

BACKGROUND

Robotic tools are widely used in industrial applications such as, material handling, machine tending, part assembling, and/or for a variety of other purposes. Robotic tools can comprise robotic manipulators that can comprise one or more motors and/or electrical drives which assists in enabling several degrees of freedom in movement of one or more mechanical components (e.g. joints, guides, actuators, control valves, and/or the like) of the robotic manipulators. The robotic manipulators may comprise an end effector that facilitates in manipulating items, (e.g., picking, gripping, moving, repositioning, reorienting, and/or replacing items). In robotic systems, operations of the mechanical components, e.g., end effectors of the robotic manipulators, are usually controlled by a computing device such as an external PC or a robotic controller associated with the robotic manipulators. In some cases, a robotic controller can perform path planning and execution of the robotic manipulator by defining rules for movement of the mechanical components of the robotic manipulators. In this regard, the robotic controller can comprise path planners or path generators, that generates path that defines motion and control of the robotic manipulator to facilitate various types of path movements (e.g. point-to-point path, controlled path, and/or continuous path movement) of respective mechanical components. Equipment that employ path planning and execution of the robotic manipulators, can be found in various industrial systems such as manufacturing, assembling, packaging and other capacities.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relates to, a robotic manipulator comprising a robotic controller. The robotic controller can comprise a programmable logic controller (PLC). The PLC is configured to receive a planned motion path comprising a first path segment to be executed by a joint of the robotic manipulator. In this aspect, the first path segment is associated with a path to be followed by the joint. According to said example embodiments, the first path segment is queued before an abort segment which is associated with the first path segment. In accordance with said example embodiments, the abort segment is indicative of a path segment that, in response to execution, results in aborting an operation of the joint of the robotic manipulator. Further, according to said example embodiments, the PLC is also configured to validate the planned motion path based on an analysis of at least the first path segment and the abort segment. Furthermore, in response to successful validation of the planned motion path, the PLC can be configured to initiate execution of the first path segment by the joint of the robotic manipulator.

In some example embodiments, the PLC can be configured to execute the abort segment in response to one of: the execution of the first path segment or in response to receiving of an event at the PLC indicating a fault condition associated with the robotic manipulator According to some example embodiments, the PLC can be configured to receive, while the planned motion path is under execution, an updated planned motion path. The update planned motion path may comprise a second path segment that defines a path to be followed by the joint in response to execution of the first path segment of the planned motion path. Further, the PLC can be configured to validate the updated planned motion path based on an analysis of at least, the first path segment, the second path segment, and the abort segment. Furthermore, according to said example embodiments, in response to successful validation of the updated planned motion path, the PLC can be configured to queue: (i) the second path segment after the first path segment to cause execution of the second path segment in response to execution of the first path segment and (ii) a second abort segment after the second path segment to cause execution of the second abort segment associated with the second path segment, in response to execution of the second path segment. However, in response to un-successful validation of the updated planned motion path, the PLC can be configured to initiate execution of the abort segment.

According to some example embodiments, the PLC receives the planned motion path and the updated planned motion path from a robotic controller. Each of the first path segment, the second path segment, and the abort segment comprises positional data points in time, indicative of a plurality of positions to which the joint of the robotic manipulator is to be moved at respective instance of time.

In some example embodiments, each of the first path segment, the second path segment, the abort segment, and the second abort segment, corresponds to positional data points. The positional data points comprise at least: a segment time, a segment length, and a time step, based on which the first path segment, the second path segment, the abort segment, and the second abort segment, are translated into joint positions to which the joint of the robotic manipulator is to be moved to execute the planned motion path.

According to some example embodiments, the planned motion path comprises a sequence of a plurality of path segments comprising at least, the first path segment, the second path segment, the abort segment, and the second abort segment, conforming to a motion type of the joint. In this aspect, the motion type is from amongst: constant velocity motion type, velocity matching motion type, limited acceleration motion type, minimum execution time motion type, shortest distance motion type, and a constant velocity motion type.

According to some example embodiments, the PLC can be configured to initiate execution of any of the abort segment and the second abort segment, in response to receiving an indication of occurrence of an event. The event corresponds to one of: a fault, an emergency condition, a communication loss, and a power failure, associated with the robotic manipulator.

According to some example embodiments, to validate at least one of the planned motion path and the update planned motion path, the PLC may perform one or more checks. For example, the PLC may perform a velocity check for the joint of the robotic manipulator based on a first motion type. The first motion type defines the planned motion path, where the first motion type is a constant velocity motion type. Additionally, and/or alternatively, the PLC may perform, an acceleration check for the joint of the robotic manipulator based on a second motion type. The second motion type defines the planned motion path, where the second motion type is a limited acceleration motion type. Additionally, and/or alternatively, the PLC may perform a missing data check to identify occurrence of missing data points defined in at least one of the first path segment, the second path segment, and the abort segment from amongst a plurality of path segments of the planned motion path. In some example embodiments, the PLC may perform a path sequence check to verify a sequence of path segments of a plurality of path segments and respective abort segments defined in the planned motion path. Additionally, and/or alternatively, in some example embodiments, the PLC may perform a path validity check to verify positional data points corresponding to at least one of the planned motion path and the updated planned motion path, to be a valid path.

According to some example embodiments, a robotic system is described. The robotic system comprises, a robotic manipulator, a computation platform, and a robotic controller. The computational platform is communicatively coupled to the robotic manipulator. According to said example embodiments, the computational platform can comprise a processor and a path planning unit communicatively coupled to the processor. The plan planning unit can be configured to, generate, a planned motion path comprising at least, a first path segment and an abort segment. In this regard, the first path segment is associated with a path to be followed by a joint of the robotic manipulator and queued before an abort segment associated to the first path segment. In accordance with said example embodiments, the abort segment is indicative of a path segment that in response to execution results in aborting an operation of the robotic manipulator. Further, the path planning unit can be configured to transmit, the planned motion path to at least one programmable controller (PLC) for execution. In accordance with said example embodiments, the robotic system comprises the robotic controller which is communicatively coupled to the computational platform and the robotic manipulator. The robotic controller comprises the PLC. The PLC can be configured to receive, from the computational platform, the planned motion path. Further, the PLC can be configured to, validate, the planned motion path based on an analysis of at least, the first path segment and the abort segment of the planned motion path. Furthermore, according to said example embodiments, in response to successful validation of the planned motion path, the PLC can be configured to, initiate execution of the first path segment.

In accordance with some example embodiments described herein, the computational platform can be configured to, generate, the planned motion path based on kinematic properties of the robotic manipulator and conforming to a motion type based on which the planned motion path is to be executed. Further, during an execution of the planned motion path, the computational platform can be configured to, alter, the planned motion path by modifying path segments of the planned motion path that are subsequent to the first path segment and are to be queued by the robotic controller for execution by the robotic manipulator.

According to some example embodiments, the PLC of the robotic system can be configured to execute the abort segment in response to the execution of the first path segment or receiving an event indicating occurrence of a fault condition associated with the robotic manipulator.

According to said example embodiments, the PLC can be configured to, receive, while the planned motion path is under execution, an updated planned motion path. The updated planned motion path comprises a second path segment that defines a path to be followed by the joint in response to the execution of the first path segment of the planned motion path. Further, the PLC can be configured to, validate the updated planned motion path based on an analysis of at least, the first path segment, the second path segment, and the abort segment. According to said example embodiments, in response to successful validation of the updated planned motion path, the PLC can be configured to queue: (i) the second path segment after the first path segment to cause execution of the second path segment in response to execution of the first path segment and (ii) a second abort segment after the second path segment to cause execution of the second abort segment associated with the second path segment, in response to execution of the second path segment. However, in response to un-successful validation of the updated planned motion path, the PLC can be configured to, initiate execution of the abort segment in response to execution of the first path segment.

According to some example embodiments, the planned motion path defines a sequence of a plurality of path segments comprising at least, the first path segment, the second path segment, the abort segment, and the second abort segment. In this regard, each path segment of the plurality of path segments comprises positional data points in time, indicative of a plurality of positions to which the joint of the robotic manipulator is to be moved, at respective instances of time.

In some example embodiments, the first path segment, the second path segment, the abort segment, and the second abort segment of the planned motion path corresponds to positional data points. For instance, in said example embodiments, the positional data points comprises at least: a segment time, a segment length, and a time step, based on which the first path segment, the second path segment, and the abort segment are translated into joint positions to which the joint is to be moved to execute the planned motion path.

According to some example embodiments, the planned motion path defines a sequence of a plurality of path segments comprising at least, the first path segment, the second path segment, the abort segment, and the second abort segment. The first path segment, the second path segment, the abort segment, and the second abort segment, described herein, are defined to conform with a motion type of the joint of the robotic manipulator. In this regard, the motion type is from amongst: constant velocity motion type, velocity matching motion type, limited acceleration motion type, minimum time motion type, and a constant velocity motion type.

Some example embodiments described herein, relates to a method comprising, receiving, by a programmable logic controller (PLC), a planned motion path. In accordance with said example embodiments, the planned motion path can comprise a first path segment and an abort segment associated with the first path segment and temporarily queued after the first path segment. Further, the planned motion path is associated with a path to be followed by a joint of a robotic manipulator. In accordance with said example embodiments, the abort segment is indicative of a path segment that in response to execution results in aborting an operation of the robotic manipulator. According to said example embodiments, the method further comprises, validating, the planned motion path based on an analysis of at least, the first path segment and the abort segment of the planned motion path. Further, in response to successful validation of the planned motion path, the method can comprise initiating execution of the first path segment.

According to some example embodiments, the method can comprise executing the abort segment in response to the execution of the first path segment or in response to receiving of an event indicating an occurrence of a fault condition of the robotic manipulator.

In some example embodiments, while the planned motion path is under execution the method can comprise receiving, an updated planned motion path comprising a second path segment that defines a path to be followed by the joint in response to the execution of the first path segment. Further, the method can comprise validating, by the PLC, the updated planned motion path based on analysis of at least, the first path segment, the second path segment, and the abort segment. Furthermore, in response to successful validation of the updated planned motion path, the method can comprise queuing, (i) the second path segment after the first path segment, to cause execution of the second path segment in response to execution of the first path segment and (ii) a second abort segment after the second path segment to cause execution of the second abort segment associated with the second path segment, in response to execution of the second path segment. In response to un-successful validation of the second path segment, the method can comprise initiating execution of the abort segment.

According to some example embodiments, the method can comprise initiating an execution of any of the abort segment and the second abort segment, in response to receiving an indication of occurrence of an event. In this regard, the event corresponds to one of: a fault, an emergency condition, a communication loss, and a power failure.

In accordance with some example embodiments, each of the first path segment, the second path segment, the abort segment, and the second abort segment, described in the method, comprises positional data points in time, indicative of a plurality of positions to which the joint of the robotic manipulator is to be moved at respective instances of time.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
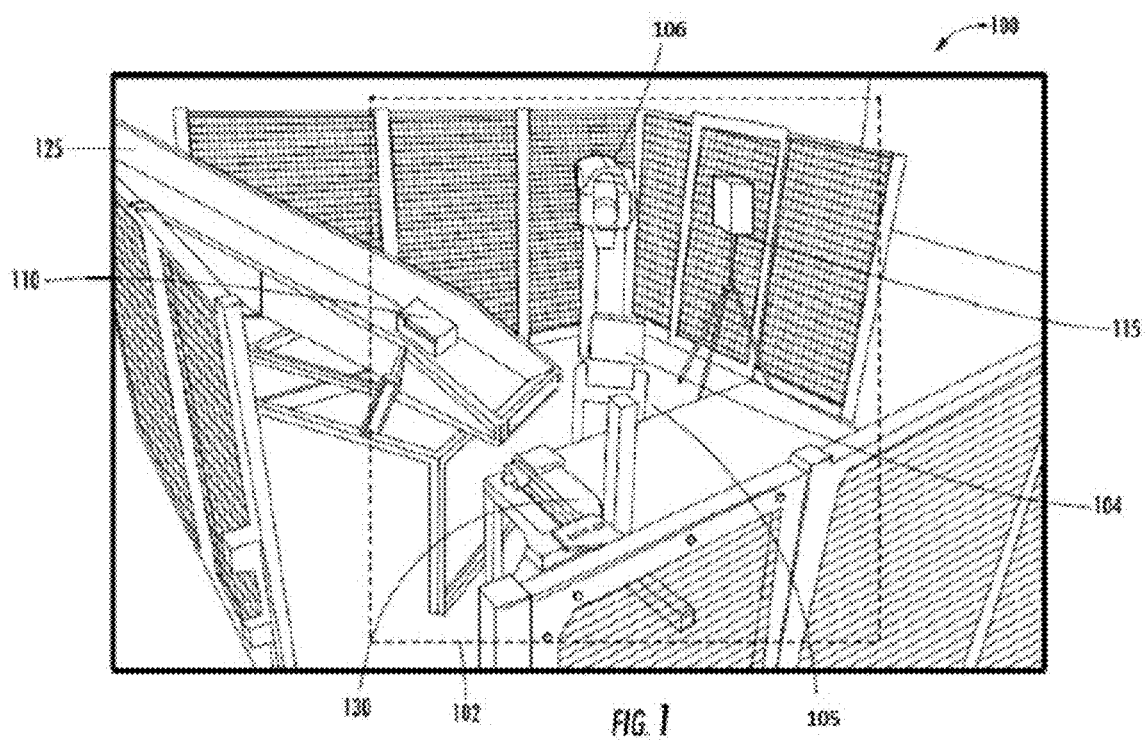
FIG. 1 illustrates a perspective view of a material handling system comprising a robotic system, in accordance with some example embodiments described herein.

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

Turning now to the drawings, the detailed description set forth below in connection with the appended drawings is intended as a description of various configurations and is not intended to represent the only configurations in which the concepts described herein may be practiced. The detailed description comprises specific details for the purpose of providing a thorough understanding of various concepts with like numerals denote like components throughout the several views. However, it will be apparent to those skilled in the art that these concepts may be practiced without these specific details.

In robotic systems, path planning of a robotic manipulator is usually used for defining and further controlling motion of one or more mechanical units (e.g. joints, guides, actuators, and/or the like) of the robotic manipulator, to move it from one location to another location in a controlled fashion. Various motion control techniques, are used for controlling movement of such mechanical units so as to enable safe execution including movement or stopping of the robotic manipulator (i.e. in a coordinated and controlled fashion). Existing motion control techniques, involve use of multi-dimensional profiles of the mechanical units (referred interchangeably hereinafter as, joints, actuators, and/or guides) to enable controlled and coordinated movement of the robotic manipulator. These motion control techniques involve performing coordinate transformations between different coordinate systems (e.g., Cartesian, cylindrical, and spherical coordinate systems) that defines freedom of movement of an end effector of the robotic manipulator. The motion control techniques also involve forward and inverse kinematic transformations, to enable coordinated movement of the mechanical units (e.g. one or more joints) in conformity with the multidimensional profiles applicable for movement of each joint of the robotic manipulators. Typically, a path planning component of a robotic controller generates multidimensional path profiles based on specified motion parameters defining a movement of the robotic manipulator. Thus, in a robotic motion, each joint of the robotic manipulator may move according to different motion parameters (e.g. speed, velocity, acceleration, etc.) to achieve a compound motion of the robotic manipulator.

In some examples, the motion parameters may comprise the following inputs—a start position of the robotic manipulator, an end position of the robotic manipulator, maximum velocity, maximum acceleration, maximum deceleration, and/or the like, associated with the robotic manipulator. Thus, it can be understood that a planned motion path generated by a path planner of the robotic system, is in conformity with different motion types (e.g., limited velocity, constant acceleration, minimum time, velocity matching, and/or the like). Although, initial conditions (e.g., an initial position, an initial velocity, initial acceleration, and/or the like) for which the robotic controller of the robotic system is, usually, preconfigured. Said differently, in an initial state of robotic execution, conditions of initiating movement of the robotic manipulator are pre-defined, based on which the robotic controller executes the initial movement. However, a further movement of the robotic manipulator is controlled by the robotic controller based on using a planned motion path which the robotic controller may receive from the path planner.

As in the robotic systems, each degree of freedom of the robotic manipulator can have dedicated electrical drives (e.g., electric motors), sensors, mechanical units (like, but not limited to, joints, guides, actuators, control values, and/or the like). Movement of the robotic manipulator is based on execution of a robot program that can comprise robotic commands defining a sequence of movement sections in between given coordinates which are defined in the planned motion path. For instance, a movement path defined in the robot program can comprise a sequence of movement sections defining a movement from a current coordinate to an intermediate coordinate, and further, to a destination coordinate. In an example, the robot program may typically comprise commands like, but not limited to, "forward move from current coordinate [x1, x2, x3, o1, o2, o3] with speed S or "linear move from an intermediate coordinate to a next coordinate plus delta [x1, x2, x3, o1, o2, o3] at speed S2. Accordingly, upon compiling the robotic program, the robotic controller calculates associated control signals for different motors which drives the one or more mechanical units of the robotic manipulator.

In the robotic systems, robotic manipulators are taught either manually or in an automated way, to follow a controlled path, i.e. a movement which ensures that an end of the robotic manipulator will follow a predictable or controlled path and orientation, as the robotic manipulator moves from one point to another point in the path. Implementing a controlled path movement of the robotic manipulator has associated challenges. For example, path planning and collision modelling of complex kinematic models applicable for the robotic manipulators has associated challenges.

Further, path planning in changing operating environments of robotic system also has associated challenges.

Various example embodiments described herein, relates to a robotic system comprising a robotic controller adapted for path planning and execution of a robotic manipulator. In some example embodiments, the robotic controller may comprise a programmable logic controller (PLC) configured to receive a planned motion path for execution and accordingly cause movement of the robotic manipulator in conformity with the planned motion path. In some example embodiments, the PLC may receive the planned motion path from a computational platform (e.g., but not limited to, an external computer, or a distributed system, or a cloud computing platform) comprising a path planner that generates the planned motion path. In accordance with said example embodiments, the planned motion path received at the robotic controller may comprise a first path segment and an abort segment, to be executed by a joint of the robotic manipulator. In this regard, the first path segment may be associated with a path to be followed by the joint of the robotic manipulator and is queued before the abort segment. The abort segment may be associated with the first path segment and indicative of a path segment that when executed results in aborting an operation of the joint of the robotic manipulator.

Further, in accordance with said example embodiments, the PLC can be configured to validate the planned motion path, received at the robotic controller. In some example embodiments, the planned motion path may be validated based on an analysis of at least, the first path segment and the abort segment. Further, upon successful validation of the planned motion path, the PLC can be configured to initiate execution of the first path segment by the joint of the robotic manipulator. However, in response to un-successful validation of the planned motion path, the PLC can be configured to initiate execution of the abort segment. In this regard, execution of the abort segment results in a controlled stop of the robotic manipulator.

According to various example embodiments described herein, the PLC of the robotic controller can also be configured to update a planned motion path, dynamically or 'on the fly, i.e. during an execution of the planned motion path by the robotic controller. In this regard, according to said example embodiments, the PLC can be configured to receive, while the planned motion path is under execution, an updated planned motion path. The updated planned motion path may comprise, a second path segment, which may not be defined in the planned motion path that was first received by the robotic controller. The second path segment of the updated planned motion path may define a path to be followed by the joint in response to execution of the first path segment of the planned motion path. Upon receiving the updated planned path, the PLC may perform validation of the updated planned motion path. In accordance with said example embodiments, in response to successful validation of the updated planned motion path, the PLC can be configured to: queue the second path segment after the first path segment and queue the abort segment after the second path segment. According to said examples, queueing the second path segment after the first path segment and before the abort segment, is to cause execution of the second path segment in response to execution of the first path segment, but before the abort segment. Similarly, queueing the abort segment after the second path segment is to cause execution of the abort segment in response to execution of the second path segment. Additionally, and/or alternatively, the PLC is also configured to execute the abort segment in response to receiving of an event at the PLC indicating a fault condition associated with the robotic manipulator.

In accordance with various example embodiments described herein, a planned motion path for a robotic manipulator may be planned by an external computing device or a computational platform. The motion path is received from the computational platform by the robotic controller comprising one or more PLCs which executes it, considering a safety state of the robotic manipulator.

By way of implementation of various example embodiments described herein, the PLC executes the planned motion path of the robotic manipulator causing movement of one or more joints of the manipulator in a controlled fashion (i.e. in conformity with the planned motion path generated by a path planner). In this regard, as the PLC validates the planned motion path, the planned path when executed by the robotic controller results in a coordinated movement, stopping, and/or other operations of one or more mechanical units (e.g., joints, guides, actuators, control valves, and/or the like) of the robotic manipulator, thereby, minimizing any chances of operating or functioning of such units beyond its functional limitations. Thus, in a case when a fault associated with the robotic system occurs or an operation of the robotic manipulator is to be stopped abruptly, by way of implementation of example embodiments described herein, each joint of the robotic manipulator follows a controlled path step to stop, instead of stopping or moving independently.

Further, by queuing the abort segment after each path segment in the planned motion path, the robotic controller, executes the planned motion path, in a manner, such that each mechanical unit of the robotic manipulator follows a predictable or controlled pathway as the robotic manipulator moves from one point to another point along the path. This controlled path movement of the robotic manipulator is maintained, even in situations, when robotic system experiences faults (e.g., extrinsic or external faults of the robotic manipulator like planning error, communication loss, etc. between the computational platform 206, the robotic controller 204, and/or the robotic manipulator 202). In some examples, to some extent, faults in control system of robotic system or faults in hydraulic, pneumatic or electrical sub controls associated with the robotic system, or malfunctioning or failure of robot power system which supplies power to robotic components, may also be prevented by way of implementation of various example embodiments described herein. Accordingly, in some cases, by way of implementation of various example embodiments described herein, in faulty situations or in cases where there is a no next path segment in the planned motion path, an execution of the planned motion path including the abort segment facilitates in a controlled stop of the robotic manipulator in a predictable fashion and not in an accidental fashion.

Further, by receiving an updated planned motion path, a motion path for the robotic manipulation under execution can be modified or updated, given the updated planned motion path is successfully validated in order to avoid any run-time faults or hard stops of the robotic manipulator. Thus, by way of implementation, various example embodiments described herein, provides multifold advantages such as, but not limited to, facilitating path planning of complex kinematic models associated with robotic manipulators, dynamically updating a planned motion path, facilitating a collision free path planning which supports different motion types for various applications and operating environments of robotic system, and coordinating timing between one or more methods of controlling movement of the robotic manipulators.

According to various example embodiments, "path segment" referred herein throughout the description defines a step, from amongst multiple steps, which is to be followed by the robotic manipulator in order to complete a path. Said differently, execution of a sequence of multiple path segments, cumulatively completes a path to be followed by the robotic manipulator. In some examples, the path segment may define: a starting coordinate from where the one or more joints of the robotic manipulator starts motion, an end coordinate, and a rule that defines parameters indicating a motion type (e.g. constant velocity, limited velocity, increasing acceleration, and/or the like) based on which the one or more joints move between those coordinates. As an example, in a path segment coordinates for a robot with six or more degrees of freedom in movement can comprise six values, three for the position in the three-dimensional space and three for the orientation.

In accordance with some example embodiments described herein, a robotic command for executing motion of the robotic manipulator may comprise path segments along with rules defining how to move the one or more joints of the robotic manipulator. As an example, these robotic commands can determine, whether the motion is linear, along a curve or along a circle segment, and/or the like. A path planner or a path generator may generate a planned motion path based on a motion type, and defines a protocol including set of rules which the robotic manipulator may follow to complete a path (i.e. reach from one position to another position).

FIG. 1 illustrates a perspective view of a material handling system 100 comprising a robotic system 102, in accordance with some example embodiments described herein. In some examples, the robotic system 102 may be installed within a material handing environment or may be adapted to move within the material handling environment to perform various operations. Illustratively, the material handling system 100 can comprise the robotic system 102 that may comprise one or more robotic manipulators configured for handling items (e.g. packages, cartons, totes, containers, parcels, articles, boxes, and/or the like) within the material handling environment. Along with the robotic system 102, the material handling system 100 may also comprise a variety of other components and/or subsystems, such as an induction conveyor, sortation system, chutes, identification systems, vision systems, and/or the like, for handling and processing items.

In accordance with some example embodiments, the material handling system 100 comprises, the robotic system 102 that may be configured to handle an item 110 from a first place to a second place in a material handling environment. The robotic system 102 may comprise a robotic manipulator having one or more end effectors for handling the item 110. For example, in some example embodiments, a robotic manipulator 105 of the robotic system 102 may be configured to pick the item 110 in a first orientation from a chute 125 and/or a conveyor (not shown), and further reorient and/or reposition the item 110 to a second orientation for placement onto a conveyor and/or any downstream subsystem of the material handling system 100. In some example embodiments, the robotic manipulator 105 may comprises a robotic arm 104 and an end effector 106 for handling the item 110. In some examples, the end effector 106 of the robotic manipulator 105 may correspond to item grasping tools (e.g., clamps, static grippers, electromagnetic grippers, electrostatic grippers, flexible suction cups, and/or the like) for handling (e.g. loading, unloading, picking, lifting, repositioning, reorienting, replacing, and/or the like) the items.

Further, in accordance with said example embodiments, the material handling system 100 may also comprise a vision system 115 having one or more sensors positioned at various locations within the material handling system 100. In some example embodiments, the vision system 115 may be configured to generate inputs corresponding to one or more characteristics of the item 110 based on which the robotic manipulator 105 of the robotic system 102 may handle the item 110. In accordance with said example embodiments, the vision system 115 may also comprise a network of imagers, sensors, cameras, identification systems, and the like for determining characteristics of one or more items in the material handling system 100. For instance, in some examples, the characteristics of the item 110 determined by the vision system 115 may comprise a body type, body shape, size, weight, position, edge detection, marker detection, label detection, orientation, and/or the like. According to some example embodiments, the characteristics of the item 110, determined by the vision system 115, may be used to control and operate one or more subsystems (e.g., the robotic system 102, the robotic manipulator 105, a control system (not shown), and/or other subsystems of the material handling system 100.

In accordance with said example embodiments, the material handling system 100 also can comprise equipment such as a control system (not shown) comprising a controller (not shown) in communication with various subsystems and/or equipment in the material handling system 100. The controller may comprise at least one processor that may execute instructions to cause specific operations of the one or more subsystems of the material handling system 100.

According to said example embodiments, the robotic system 102 may comprise a robotic controller (not shown). In accordance with various example embodiments described herein, the controller of the material handling system 100 and/or the robotic controller of the robotic system 102 may cause execution of instructions to cause the movement of the robotic manipulator 105 handle the item 110 within the material handling system 100. In some embodiments, the robotic controller may be communicatively coupled to a computational platform (e.g. an industrial computer, a distributed network of computing devices, a cloud computing based platform, an external computer, a standalone computing device, and/or the like). The computational platform may comprise a path planning unit that plans a movement of the robotic manipulator 105 and provides a planned path to the robotic controller. Details related to path planning and execution of the robotic manipulator 105 are described hereinafter.

Figure 2:
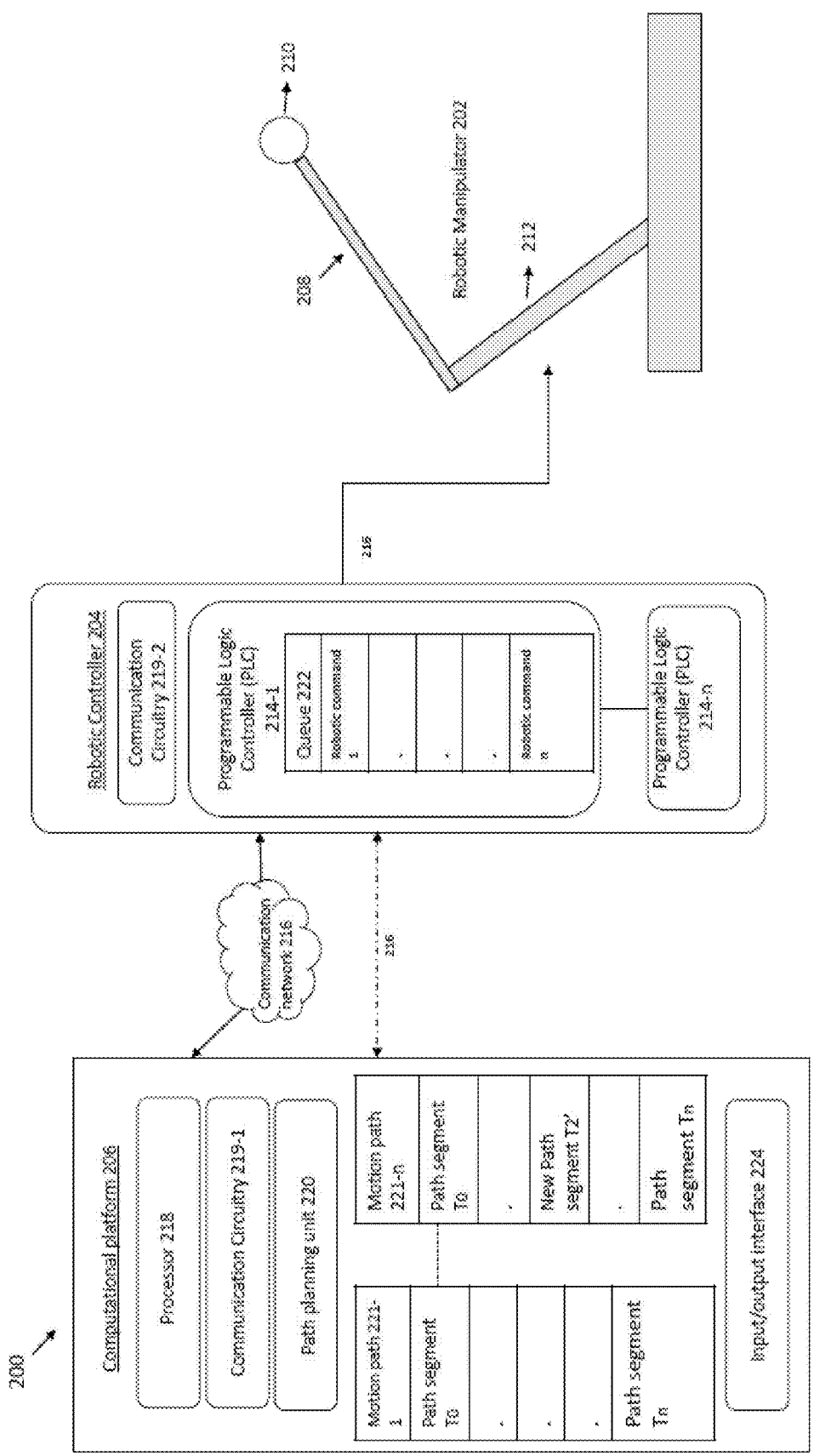
FIG. 2 illustrates a schematic view of the robotic system comprising, a robotic manipulator, a computational platform, and a robotic controller, in accordance with some example embodiments described herein.

FIG. 2 illustrates a schematic view of a robotic system 200 (similar to robotic system 102), in accordance with some example embodiments described herein. The robotic system 200 comprises, a robotic manipulator 202, a robotic controller 204, and a computational platform 206. The robotic manipulator 202 may comprise a robotic arm 208 comprising an end effector 210 and a body 212 mechanically coupled to the robotic arm 208. In some examples, the body 212 may comprise a sequence of mechanical and electrical links and joints and/or combinations, that operate to cause movement of the robotic manipulator 202. According to some example embodiments, the robotic arm 208 (including the end effector 210) and the body 212 of the robotic manipulator 202 may be of any configuration (e.g. Gantry robot type, Cylindrical robot type, Polar robot type, Jointed arm robot type, and/or the like) depending on an application for which the robotic manipulator 202 is to be used. The robotic manipulator 202, in accordance with various example embodiments, may comprise one or more mechanical components such as, but not limited to joints, guides, actuators (linear or rotatory), valves, etc., operations of which may be controlled by the robotic controller 204. In said example embodiments, the robotic manipulator 202 may be either servo or non-servo controlled.

In some examples, the robotic manipulator 202 may be positioned in a material handling environment (e.g. the material handling system 100) to manipulate items via the end effector 210 that may correspond to an item gripper (e.g. a vacuum suction cups based item gripper, or a clamp based gripper, an electromagnetic gripper, and/or the like) adapted for picking and/or gripping the items, and further manipulating it from one position to another. In some examples, the robotic manipulator may correspond to a robotic truck loader/unloader for loading and/or unloading items or a packet picker, mix load palletizer, de-palletizer and/or the like that may operate in a material handling environment.

In accordance with said example embodiments described herein, the robotic controller 204 of the robotic system 200 may be configured to control operations of the robotic manipulator 202 (including its mechanical and/or non-mechanical components). The robotic controller 204 may be communicatively coupled to the robotic manipulator 202 (e.g. via wired or wireless communication mechanism). The robotic controller 204 may comprise one or more programmable logic controllers (PLCs) 214-1, 214-2 . . . 214-n. The one or more programmable logic controllers (PLCs) 214-1, 214-2 . . . 214-n may be configured to execute a planned motion path. In some examples, the robotic controller 204 may receive the planned motion path from the computational platform 206, via a communication network 216. The planned motion path herein, corresponds to a protocol defining movement of the one or more mechanical units (e.g. guides, actuators, joints, and/or the like) of the robotic manipulator 202 in conformity with a motion type. Thus, each joint of the robotic manipulator 202 moves or steps in such a manner, so as to follows a path of the end effector defined in the planned motion path. Further details related to execution of the planned motion path according to the motion type, by the robotic controller 204 are described in reference to FIGS. 3-6.

According to some example embodiments, the one or more PLCs 214-1, 214-2 . . . 214-n of the robotic controller 204 may cause coordination and triggering of working sequences of various robotic components (mechanical and/or non-mechanical) of the robotic manipulator 202. In some example embodiments, the one or more PLCs 214-1, 214-2 . . . 214-n may be programmed by a computing device (e.g. the computational platform 206, or any other external computer) using a standardized programming protocol (e.g., but not limited to, IEC 61131-3) thereby enabling an end user to program operations of the one or more PLCs 214-1, 214-2 . . . 214-n, using a language known by the end user. In accordance with said example embodiments, the one or more PLCs 214-1, 214-2 . . . 214-n of the robotic controller 204 may comprise function blocks which may be sequentially connected to each other. Each function block corresponding to the one or more PLCs 214-1, 214-2 . . . 214-n may comprise one or more input scan lines, a function block, and one or more output scan lines configured to perform a dedicated or customized operation (e.g. execution of one or more path segments defined in the planned motion path of the robotic manipulator 202). In some examples, the one or more PLCs 214-1, 214-2 . . . 214-*n* may load a planned motion path received from the computational platform 206 into a respective cam profile of the robotic manipulator 202 and locks the joint to the cam profile for execution by the robotic manipulator 202.

In accordance with various example embodiments described herein, the computational platform 206 may correspond to any of: a standalone computer, a remote computing device, a distributed network of computing devices, a cloud computing platform or service, a group of connected computers, and/or the like. The computational platform 206 comprises a processing circuitry 218, a communication circuitry 219-1, and a path planning unit 220, communicatively coupled to each other. For instance, the path planning unit 220 may be communicatively coupled to the processing circuitry 218 and the communication circuitry 219-1. According to said example embodiments, the path planning unit 220 of the computational platform 206 may be configured to generate, one or more planned motion paths 221-1, 221-2 . . . 221-*n*, each defining a motion path for executing movement of one or more mechanical units (e.g. joints, actuators, guides etc.) of the robotic manipulator 202. In some examples, the planned motion path generated by the path planning unit 220 may comprise a sequence of path segments to be executed by the robotic controller 204 at different instances of time, viz. $T_0, T_1 \ldots T_n$.

In accordance with said example embodiments, the planned motion path generated by the path planning unit 220 of the computational platform 206, may be translated into joint positions per time step that is to be executed by the one or more joints of the robotic manipulator 202. Further, the computational platform 206 may pass the planned motion path along with identifying information such as, start time, segment length, time step associated with the one or more joints and the path, to the robotic controller 204 for execution. In this aspect, the planned motion path corresponds to a direct joint commanded position per time step which makes motion type irrelevant to the one or more PLCs (214-1, 214-2 . . . 214-*n*) of the robotic controller 204.

It should be appreciated that, in some example embodiments, the processing circuitry 218 may comprise a separate processor, specially configured field programmable gate array (FPGA), or application specific interface circuit (ASIC) to perform various operations described herein.

In some example embodiments, the planned motion path may define at least, a first path segment and an abort segment queued after the first path segment for execution by the robotic controller 204. In this regard, the first path segment is associated with a path to be followed by one or more mechanical components (e.g. guides, actuators, joints, and/or the like) of the robotic manipulator 202 and the abort segment is indicative of a path segment that, in response to execution, results in aborting an operation of the robotic manipulator 202. Further details related to execution of the planned motion path by the robotic controller 204 are described in reference to FIG. 3.

According to some example embodiments, the computational platform 206 can be configured to, generate, the planned motion paths (221-1, 221-2 . . . 221-*n*) based on kinematic properties of the robotic manipulator 202. Further, the planned motion paths (221-1, 221-2 . . . 221-*n*) may conform to a motion type based on which it is to be executed. For example, some planned motion paths generated by the path planning unit 220 of the computational platform 206 may conform to the motion types such as, but not limited to, constant velocity motion type, velocity matching motion type, limited acceleration motion type, minimum time motion type, and a constant velocity motion type. Having said that, a motion type of the robotic manipulator 202 defines rules for movement of one or more mechanical components (e.g. joints, guides, actuators, and/or the like) of the robotic manipulator 202. For example, a minimum time motion type defines a motion where each joint of the robotic manipulator 202 moves for shortest amount of time to get to a second point from a first point in the controlled path. Similarly, a shortest distance motion type defines a motion where each joint of the robotic manipulator 202 moves for a shortest distance to get to an end point from a start point.

According to various example embodiments described herein, the robotic controller 204 may be communicatively coupled to the computational platform 206 via the communication network 216. In some examples, the robotic controller 204 and the computational platform 206 may communicate via communications circuitry (219-2, 219-1) associated with the robotic controller 204 and/or the computational platform 206, respectively. The communications circuitry (219-2, 219-1) referred herein, may be any means such as a device or circuitry embodied in either hardware or a combination of hardware and software associated with the robotic controller 204 and/or the computational platform 206. The communications circuitry (219-2, 219-1) may be configured to receive and/or transmit data from/to a network and/or any other device, circuitry, or module in communication with the robotic controller 204 and/or the computational platform 206. In some examples, the communications circuitry (219-2, 219-1) may comprise a network interface for enabling communications with a wired or wireless communication network. For example, the communications circuitry (219-2, 219-1) may comprise one or more network interface cards, antennae, buses, switches, routers, modems, and supporting hardware and/or software, or any other device suitable for enabling communications via the communication network 216. Additionally, or alternatively, the communications circuitry (219-2, 219-1) may comprise the circuitry for interacting with the antenna(s) to cause transmission of signals via the antenna(s) or to handle receipt of signals received via the antenna(s). These signals may be transmitted by any of the robotic controller 204 and/or the computational platform 206 over the communication network 216, using a number of wireless personal area network (PAN) technologies, such as, but not limited to, Bluetooth® v1.0 through v3.0, Bluetooth Low Energy (BLE), infrared wireless (e.g., IrDA), ultra-wideband (UWB), induction wireless transmission, and/or the like or via a wired communication technology, such as a data field bus, cables etc.

In accordance with said example embodiments, the computational platform 206 may be configured to transmit via the communication network 216, one or more planned motion paths (221-1, 221-2 . . . 221-*n*) to the robotic controller 204 for execution by the robotic manipulator 202. In some example embodiments, the computational platform 206 may also be configured to alter, modify, or update, a planned motion path that may be under execution by the robotic controller 204. For example, in some cases, the computational platform 206 may modify one or more path segments that are queued, by the robotic controller 204, for execution (for example, path segments PS ($T_1 \ldots Tn$) queued up for execution subsequent to a path segment PS ($T_0$) under execution by the robotic manipulator 202). In some examples, the computational platform 206 may add a new path segment to the planned motion path and send an updated planned motion path to the robotic controller 204. In such cases, the robotic controller 204 may be configured to validate the updated planned completion path and initiate execution of the updated planned completion path.

By validating the planned motion path or the updated motion path, before queuing it for execution, the robotic controller 204 takes care of a safety status of operation of the robotic manipulator 202. For instance, in some cases, if the planned motion path or the updated planned motion path is invalid, the robotic controller 204 may cause execution of the abort segment, that results in aborting operation of the robotic manipulator 202 in a controlled manner, instead of continuing execution beyond its operational limits.

According to some example embodiments, the robotic controller 204 maintains a command queue 222 for queuing orchestrated robotic commands defined in the planned motion path received by the robotic controller 204. The robotic controller 204 may be configured to sequentially integrate in the command queue 222, robotic commands indicative of path segments PS ($T_0$, $T_1$, ... Tn) defined in the planned motion path and associated rules for execution of the planned motion path by the robotic manipulator 202. In some examples, the command queue 222 of the robotic controller 204 may be defined by one or more shifting registers. In this regard, in some examples, a first set of path segments which are yet to be queued for execution, by the robotic controller 204, may be stored within a first defined area of the sifting registers and a second set of path segments which are queued by the robotic controller 204 and are to be executed are stored within a second defined area of the shifting registers. The robotic controller 204 may also be configured to store along with each robotic command (representing a path segment) additional information including its current status that indicates its state of execution within the command queue 222. Further, the robotic controller 204, upon execution of a robotic command, may eliminate the executed path segment from the command queue 222.

According to said example embodiments, the computational platform 206 may also comprise an input/output (I/O) circuitry 224 that may be adapted to receive one or more inputs and provide one or more outputs. In some embodiments, the I/O circuitry 224 may, in turn, be in communication with the processing circuitry 218 to provide output to a user and, in some embodiments, to receive an indication of user input. The I/O circuitry 224 may comprise a user interface and may comprise a display that may comprise a web user interface, a mobile application, a client device, and/or the like. In some embodiments, the I/O circuitry 224 may also comprise a keypad, a joystick, a touch screen, touch areas, soft keys, a microphone, a speaker, or other input/output mechanisms. The processing circuitry 218 and/or a user interface circuitry comprising a processor associated with the I/O circuitry 224 may be configured to control one or more functions of one or more user interface elements associated with the I/O circuitry 224 through computer program instructions (e.g., software and/or firmware) stored on a memory accessible to the processing circuitry 218. In some examples, the I/O circuitry may receive an input indicating an updating of a planned motion path.

In some example embodiments, the planned motion path, generated by the path planning unit 220 of the computational platform 206, may comprise positional data points representing coordinates of various positions to which an end effector of the robotic manipulator 202 is to be moved. For example, the positional data points may comprise a starting point defined in a first path segment for movement of a joint of the robotic manipulator 202 and an end point defined in the path segment which may be a starting point for a preceding path segment. In this aspect, all path segments defined in the planned motion path may be homogenously linked together so that the coordinates at which the robotic manipulator 202 is to be moved can be over-redundant. Further details of planning and execution of the planned motion path are described in reference to FIGS. 3-6.

Figure 3:
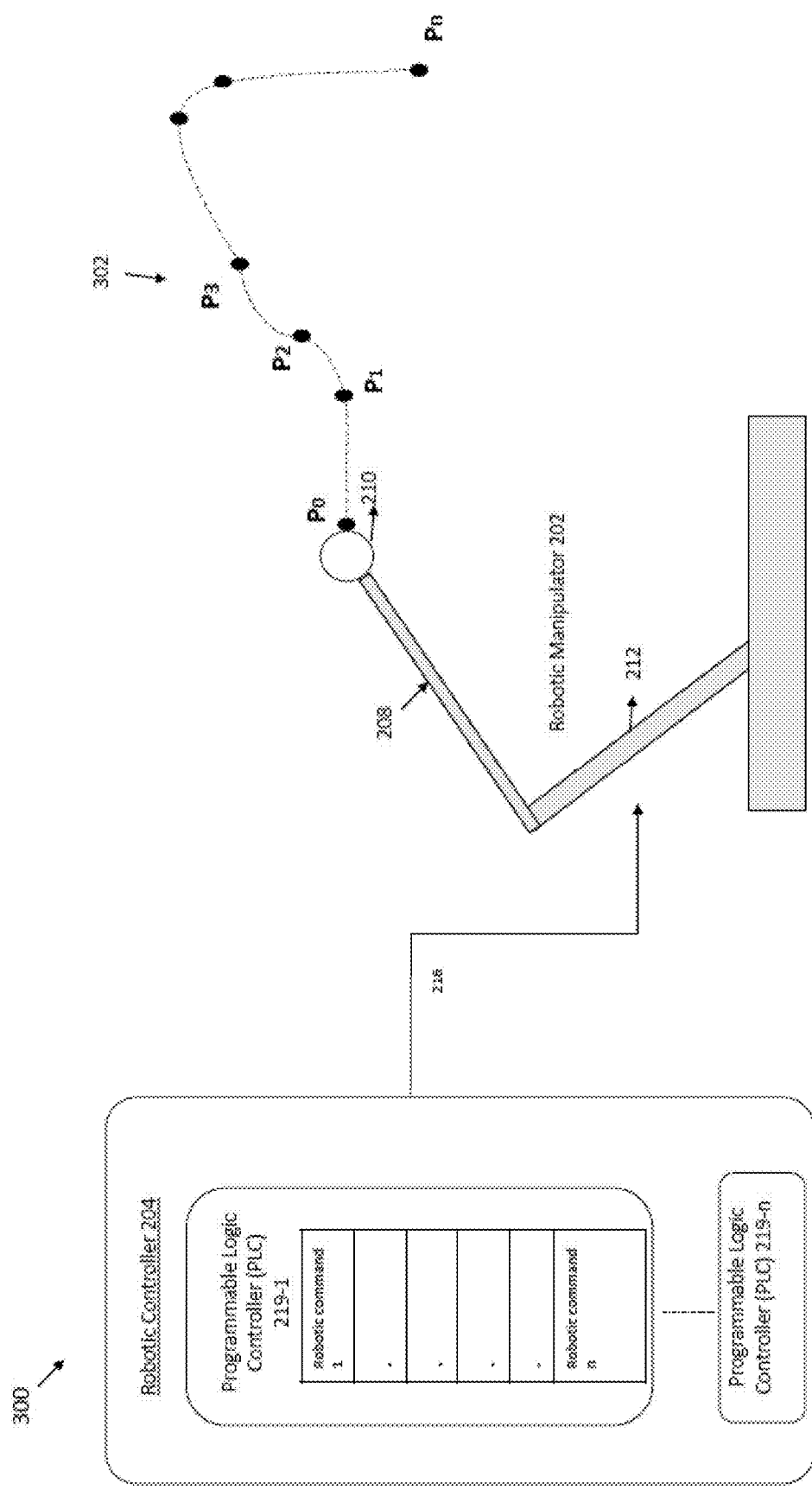
FIG. 3 illustrates a schematic view of the robotic controller configured for path planning and execution of the robotic manipulator, in accordance with some example embodiments described herein.

FIG. 3 illustrates a schematic view 300 of the robotic controller 204 configured for path planning and execution of the robotic manipulator 202, in accordance with some example embodiments described herein. In accordance with said example embodiments, the robotic controller 204 may receive a planned motion path comprising one or more path segments which upon execution by the robotic controller 204 moves the end effector of the robotic manipulator 202 along a controlled path. Said differently, a path to be followed by the end effector of the robotic manipulator 202, is a series of small paths taken by various joints of the end effector.

Referring to FIG. 3, path 302 from point $P_0$ to point Pn can comprise one or more path segments $P_0P_1$, $P_1P_2$, $P_2P_3$, and so on, each defining path to be followed by one or more joints of the robotic manipulator 202. For example, in some embodiments, the planned motion path may comprise path segments ($P_0P_1$, $P_1P_2$, $P_2P_3$ ... $P_{(n-1)}$ Pn) to be executed at instances of time (T0, T1, T2 ... Tn) respectively. The path segments upon execution, causes the end effector of the robotic manipulator 202 to move along a controlled path, i.e. the path 302 defined by points P0->P1->P2-> ... Pn (representing co-ordinates in a Cartesian co-ordinate system). Additionally, and/or alternatively, the path segments of the planned motion path may also define various orientations (O1, O2, O3 ... On) to which the end effector of the robotic manipulator 202 may be oriented, at each instance of time T0, T1, T2 ... Tn, as the robotic manipulator 202 moves along the controlled path defined by the points P0->P1->P2-> ... Pn. In this regard, according to various example embodiments described herein, the one or more PLCs (214-1, 214-2 ... 214-n) of the robotic controller 204 executes a per joint basis movement of the robotic manipulator 202 based on the path segments defined in the planned motion path.

Figure 4:
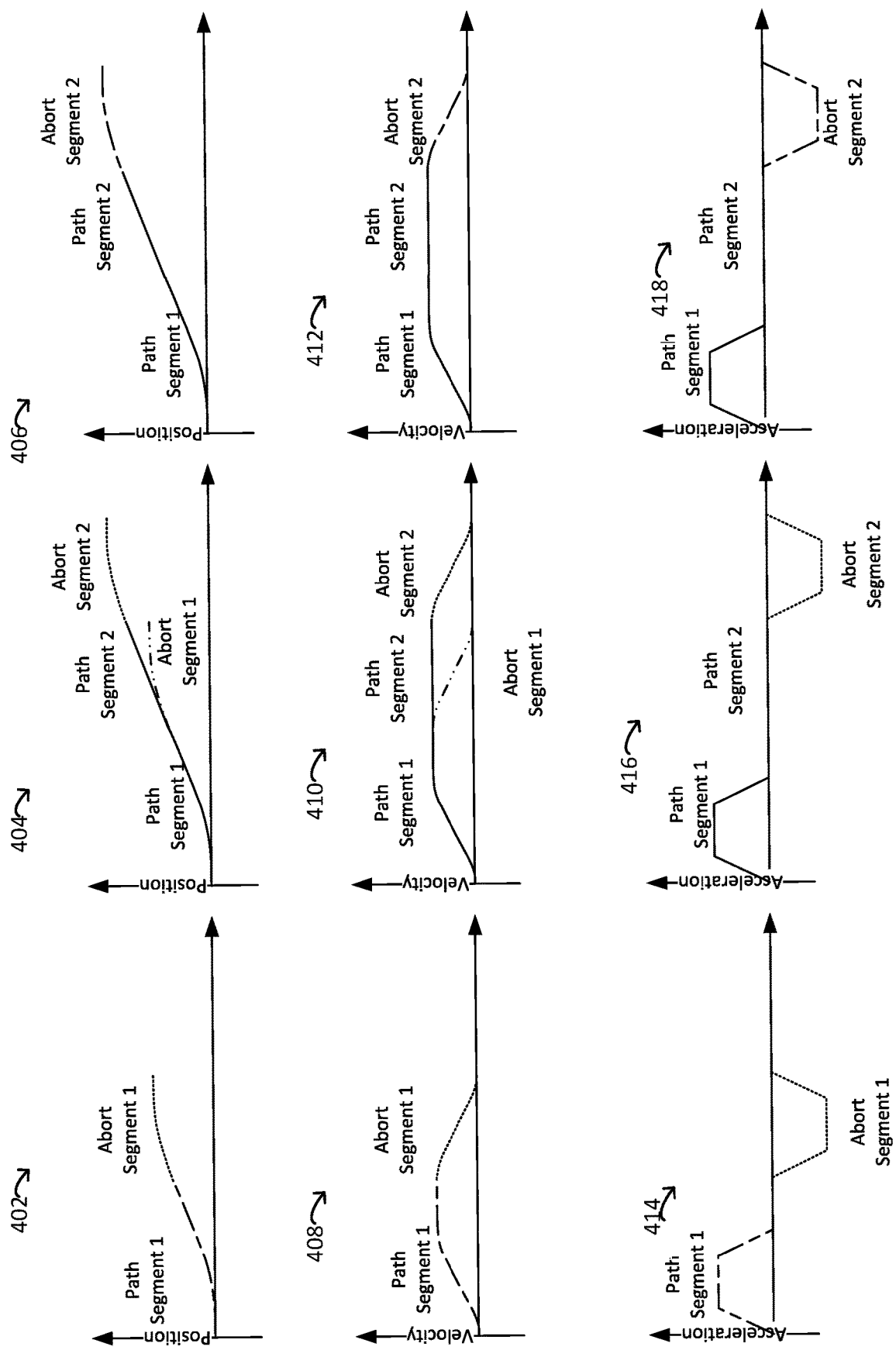
FIG. 4 illustrates various graphical representations of path planning and execution of the robotic manipulator, in accordance with some example embodiments described herein.

FIG. 4 illustrates multiple graphical representations (GRs) associated with path planning and execution of a planned motion path of the robotic manipulator 202, in accordance with some example embodiments described herein. In this regard, GR 402, 404 ... 418 corresponds to various graphical representations of a planned motion path and an updated planned motion path, defined for execution by a joint of the robotic manipulator 202, by the robotic controller 204.

Illustratively, GR 402, represents a positional-distribution of various positions (along Y axis) of a joint of the robotic manipulator 202 over respective instances of time (along X axis) that are defined in a planned motion path (received by the robotic controller 204). Similarly, GR 404 and 404, represents a distribution of positions of a joint of the robotic manipulator 202 over a period of time, defined according to an updated planned motion path. Illustratively, the planned motion path represented in GR 402 comprises a first path segment (Path segment 1) queued before an abort segment (Abort segment 1). A dotted line of the first path segment (Path segment 1) represents that the one or more PLCs (214-1, 214-2 ... 214-n) of the robotic controller 204 has queued in the command queue 222, the first path segment for execution by the joint of the robotic manipulator 202. A solid line of the abort segment (Abort segment 1) represents that the abort segment is planned to be queued in the command queue 222 after the first path segment, to cause execution of the abort segment in response to the execution of the first path segment by the joint of the robotic manipulator 202.

Further, GR 404 and 406 represents the updated planned motion path indicating an update in the planned motion path illustrated in GR 402. The updated planned motion path comprises: the first path segment (Path segment 1), a second path segment (Path segment 2), and an abort segment (Abort segment 2). As illustrated, the second path segment (Path segment 2) is queued between the first path segment and the abort segment (Abort segment 2). Said differently, (a) the abort segment (Abort segment 2) is queued after the second path segment and (b) the second path segment is queued after the first path segment such that, the second path segment is planned to be executed in response to execution of the first path segment and the abort segment (Abort segment 2) is planned to be executed in response to execution of the second path segment, by the robotic controller 204.

Referring to GR 404, a dotted line of the second path segment (Path segment 2) represents that the one or more PLCs (214-1, 214-2 . . . 214-n) of the robotic controller 204 queued the second path segment in the command queue 222, for execution by the robotic manipulator 202 and solid line of a abort segment (Abort segment 2) queued after the second path segment represents that the abort segment (Abort segment 2) is planned to be executed in response to execution of the second path segment, by the robotic controller 204.

In accordance with said example embodiments, GR 408, 410, and 412 represents velocity distribution of the planned motion path and the updated planned motion path for which positional distribution is illustrated in GR 402, 404, and 408 respectively. In this regard, GR 408 represents distribution of velocity (on Y axis) vs. time (on X axis) of the joint of the robotic manipulator 202 according to the planned motion path. Further, GR 410 and 412 represents distribution of velocity (on Y axis) vs. time (on X axis) of the joint of the robotic manipulator 202 in accordance with the updated planned motion path (i.e. path comprising second path segment).

Referring to GR 408, a joint of the robotic manipulator 202, upon initiating a movement in accordance to the first path segment (path segment 1) may accelerate to gain a desired velocity (for example, up to Velocity V1 at time instance T1) and then moves with a constant velocity V1 up to time instance T2. Thereafter, for executing the abort segment (Abort segment 1) in response to execution of the first path segment, from time instance T2 to T3, the joint deaccelerates its movement to reduce velocity and ultimately achieve 0 velocity at time instance T3. However, referring to GR 410 and 412, as the second path segment is comprised after the first path segment, in the updated planned path (see GR 404), at time instance T2, the joint continues to move with the constant velocity V1 up to time instance T3, and thereafter deaccelerates between time instance T3 to T4, while executing the abort segment (Abort segment 2). GR 412, represents execution of the abort segment 2, where the joint deaccelerates its movement to reduce velocity from V1 and achieve 0 velocity at time instance T4. Accordingly, GR 414-418 represents acceleration distribution of joint of the robotic manipulator 202, based on the planned motion path and the updated planned motion path for which positional distribution is illustrated in GR 402-406 respectively and velocity distribution is illustrated in GR 408-412 respectively.

In accordance with various example embodiments, the one or more PLCs (214-1 . . . 214-n) of the robotic controller 204 manages execution of motion of joints of the robotic manipulator 202 in a manner such that, the robotic controller 204 can receive an updated planned motion path, (i.e. paths represented in GR 404, 406, 410, 412, 416, 418 comprising a second path segment that may not be present in original planned path, i.e. the planned motion path represented in GR 402, 408, 414). In this regard, in accordance with various example embodiments described herein, the PLC (214-1 . . . 214-n) can be configured to override a path segment (abort segment 1) planned after a currently executing path segment (Path segment 1) and update the planned motion path to comprise a new path segment (i.e. the second path segment) to be executed in response to execution of the first path segment (Path segment 1).

According to said example embodiments, by planning a planned path motion for each joint of the robotic manipulator 202 (i.e. planned motion path where a respective abort segment is queued after each path segment) and executing the planned motion path, the robotic manipulator 202 may not take a hard or accidental stop in case of a fault, rather, take a controlled or coordinated stop. For example, in an instance, even if one or more joints of the robotic manipulator 202 are moving at a high velocity along its respective axis/directions, in case of a sudden stopping or a fault, each joint (axis) of the robotic manipulator 202 would have its own coordinated abort segment in planned motion path for the respective joint, which upon execution, by the robotic controller 204, causes the end effector of the robotic manipulator 202 to move in a controlled and coordinated manner along the predictable path.

According to said example embodiments, the robotic manipulator 202 may comprise multiple joints, where each joint may follow its own path (i.e. move into along a respective axis) such that, a cumulative motion of the multiple joints of the end effector 210 of the robotic manipulator 202 in multiple dimensions/axis to causes a compound motion of the robotic manipulator 202 according to a planned motion path (e.g. path P0->P1->P2-> . . . Pn, as illustrated in FIG. 3). In this regard, as the planned motion path can comprise an abort segment queued after path segments for each joint (from amongst the multiple joints) of the robotic manipulator 202, the end effector 210 of the manipulator always moves in a controlled or predictable fashion. Said differently, if due to sudden fault, or an emergency, the abort segment is to be executed, each joint of the robotic manipulator 202 moves in a manner so as to abort operation (e.g. stop movement) of the robotic manipulator 202 in a controlled fashion, i.e. in a coordinated way. For example, in some cases, the end effector 210 of the robotic manipulator may correspond two robotic arms configured to pick a box and re-position it from one location to another. In such cases, it would be desired, that the two arms may not move in a manner which causes a collision of the two robotic arms, resulting in pressing the box or dropping the box. By moving the robotic manipulator 202 based on the planned motion path, as described herein, such erroneous movement of the robotic manipulator 202 may be avoided.

Figure 5:
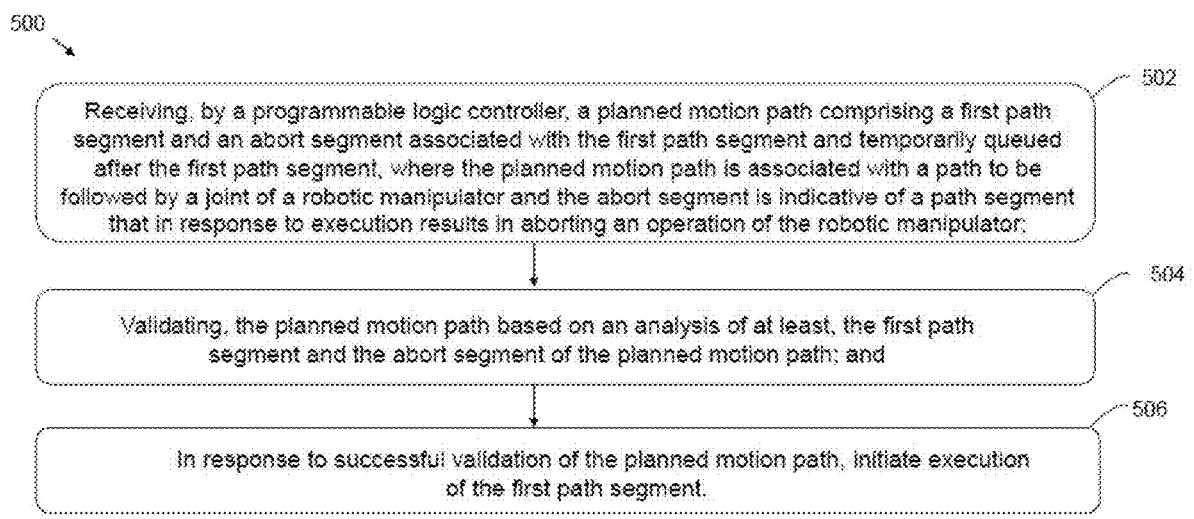
FIG. 5 illustrates a flowchart representing a method for path planning and execution of the robotic manipulator, in accordance with some example embodiments described herein.
Figure 6:
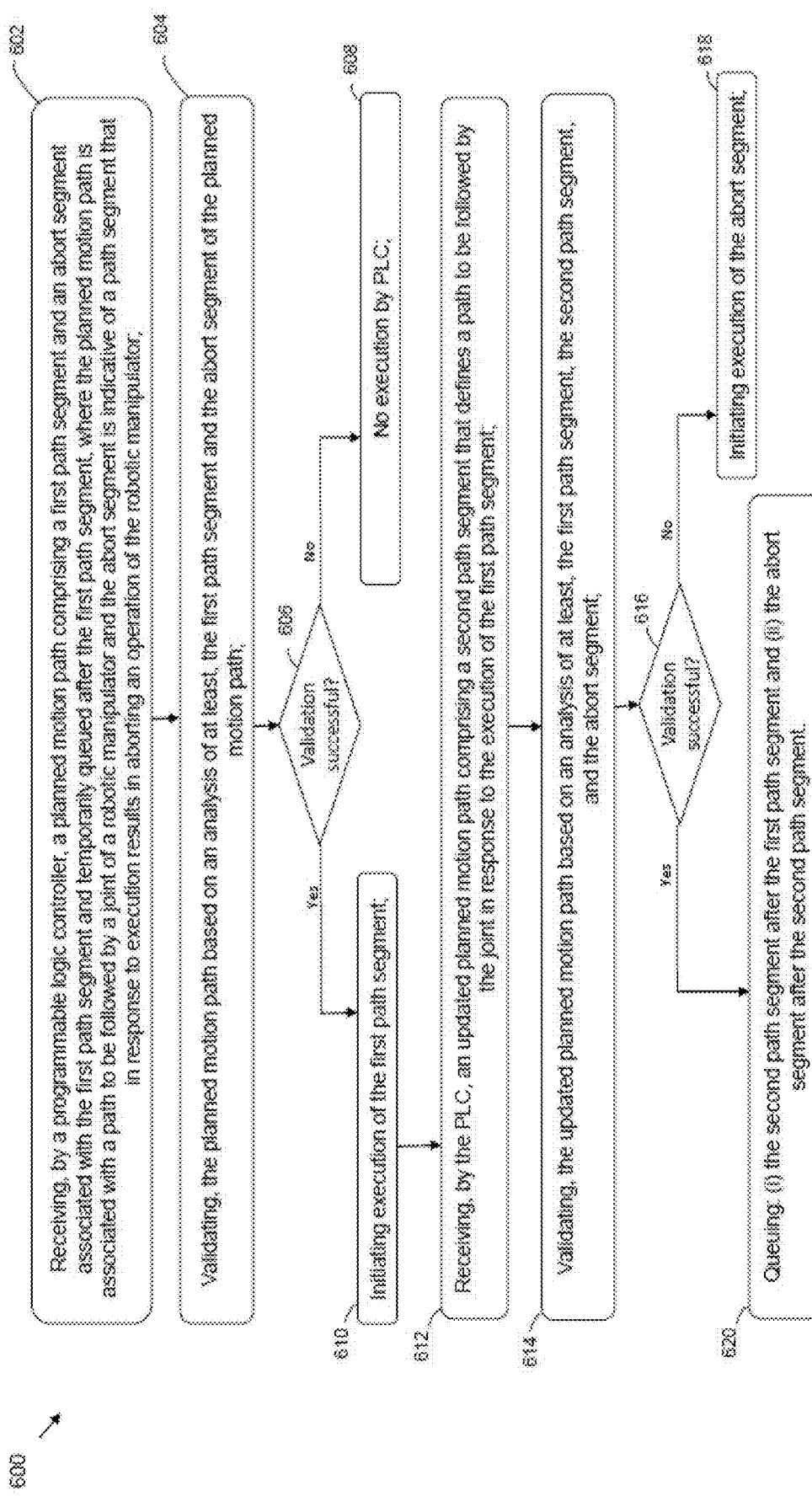
FIG. 6 illustrates a flowchart representing another method for path planning and execution of the robotic manipulator, in accordance with some example embodiments described herein.

FIGS. 5-6 illustrates an example flowcharts representing methods for path planning and execution of the robotic manipulator 202 by the robotic system 200, as described in FIGS. 2-3, in accordance with various embodiments described herein. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present disclosure and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 5-6 when executed, convert a computer or processing circuitry into a particular machine configured to perform an example embodiment of the present disclosure. Accordingly, the operations of FIGS. 5-6 define an algorithm for configuring a computer or processor, to perform an example embodiment. In some cases, a general-purpose computer may be provided with an instance of the processor which performs the algorithm of FIGS. 5-6 to transform the general-purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

FIG. 5 illustrates a flowchart representing a method 500 for path planning and execution of the robotic manipulator 202, in accordance with some example embodiments described herein. According to various example embodiments, at step 502, the robotic system 200 may comprise means such as, the robotic controller 204 including one or more PLCs (214-1, 214-2 . . . 214-n) to receive a planned motion path. The planned motion path received by the robotic controller 204 may comprise, a first path segment and an abort segment queued after the first path segment. In this regard, the first path segment is associated with a path to be followed by a joint of the robotic manipulator 202. Further, the abort segment is indicative of a path segment that in response to execution results in aborting an operation of the robotic manipulator 202.

Moving to step 504, the robotic system 200 may comprise means such as, the robotic controller 204 configured to validate, the planned motion path received at step 502. In this regard, the robotic controller 204 may validate the planned motion path based on an analysis of at least, the first path segment and the abort segment of the planned motion path. In this aspect, the robotic controller 204, based on the validation at step 504, may identify the planned motion path to be either of a valid path or an invalid path. In response to successful validation of the planned motion path, at step 506, the robotic controller 204 of the robotic system 200 may initiate execution of the first path segment. In this regard, the robotic controller 204 may queue the first path segment and the abort segment in the command queue 222 maintained by the robotic controller 204 and further executes the first path segment to cause movement of the robotic manipulator 202: (a) from a starting point to an end point defined in the first path segment, (b) from a starting orientation to a second orientation defined in the first path segment, and/or (c) in conformity with a motion type defining the first path segment.

FIG. 6 illustrates a flowchart representing another method 600 for path planning and execution of the robotic manipulator 202, by the robotic controller 204, in accordance with some example embodiments described herein. At step 602, the robotic system 200 may comprise means such as, the robotic controller 204 including one or more PLCs (214-1, 214-2 . . . 214-n) to receive a planned motion path. In some examples, the robotic controller 204 may receive the planned motion path generated by the computational platform 206. The planned motion path may define a sequence of path segments. For instance, in some examples, the planned motion path may comprise, at least, a first path segment and an abort segment, that is to be queued after the first path segment in the command queue 222, for execution by the robotic manipulator 202. According to said example embodiments, the planned motion path is associated with a path (e.g. a controlled path defined by the points P0-> P1->P2-> . . . Pn as illustrated in FIG. 3) to be followed by at least a joint of the robotic manipulator 202. Further, the abort segment is indicative of a path segment which upon execution results in aborting an operation of the robotic manipulator 202.

Upon receiving the planned motion path, at step 604, the robotic system 200 may comprise means such as, the robotic controller 204 to validate, the planned motion path. According to said example embodiments, the planned motion path may be validated based on an analysis of at least, the first path segment and the abort segment of the planned motion path. For instance, in some examples, the robotic controller 204 may perform a missing data check on the planned motion path, to identify if any identification data corresponding to any of the first path segment or the abort segment is missing definition of the planned motion path, received by the robotic controller 204. In another example, the robotic controller 204 may validate one or more path segments of the planned motion path by identifying a sequential path segment or a start of a motion path. In some examples, the robotic controller 204 may validate the planned motion path based on a positional check against limits and continuations between different path segments (e.g. a sequence of path segments between the first path segment and the abort segment). In some examples, the robotic controller 204 may validate the planned motion path by performing velocity check against limits and continuations between different path segments defined in the planned motion path. Accordingly, the robotic controller 204 may perform various validation checks to validate the planned motion path received at step 602 and before initiating its execution.

Moving to step 606, based on whether the validation performed at step 604 is successful or un-successful, the method may move to step 608 or at step 610. For instance, in response to un-successful validation of the planned motion path, the method moves to 608. At step 608, the robotic controller 204 of the robotic system 200, may not execute a planned path.

Alternatively, in response to successful validation of the planned motion path, the method moves to step 610. At step 610, the robotic controller 204 may initiate execution of the first path segment. In this regard, the robotic controller 204 may initiate movement of the joint based on the first path segment. For example, in some cases, the robotic controller 204 may execute movement of the robotic manipulator 202 from a starting point ($P_0$) to an end point ($P_1$) defined for the first path segment. In some examples, the robotic controller 204 may initiate execution of the first path segment by accelerating movement of the joint to gain a velocity V1 of the joint at a time instance T1, as illustrated in GR 408 of FIG. 4.

In some example embodiments, at step 610, for initiating the execution of path segment, the one or more PLCs (214-1, 214-2 ... 214-n) of the robotic controller 204 may queue a valid sequential path segment (i.e. the first path segment) when there is no queued path segment in the command queue 222 maintained by the robotic controller 204. Further, according to said examples, the one or more PLCs (214-1, 214-2 ... 214-n) of the robotic controller 204 may execute the queued path segment (i.e. the first path segment) and may further temporarily queue the abort segment to be executed in response to execution of the first path segment. The robotic controller 204 may perform this, in situations, where execution of a previous path segment is completed or there is no path segment currently in execution at a scheduled execution time.

Moving to step 612, according to some example embodiments, the one or more PLCs (214-1, 214-2 ... 214-n) of the robotic controller 204 may receive an updated planned motion path. The updated planned motion path may comprise a second path segment that defines a path to be followed by the joint, in response to the execution of the first path segment. In some examples, the updated planned motion path may be received while the planned motion path (i.e. including the first path segment queued before the abort segment) is already under execution by the robotic manipulator 202. For example, in some cases, the robotic controller 204 may incrementally receive path segments of the planned motion path from an external computer (e.g. the computational platform 206). As the robotic controller 204 receives each robotic command, i.e. a path segment, the robotic controller 204, via one or more PLCs (214-1, 214-2 ... 214-n) queues the respective robotic command in the command queue 222 for execution. In such cases, after queueing an initial planned motion path received at step 602, the robotic controller 204 may receive the updated planned motion path which defines the second path segment to be executed after the first path segment (instead of executing the abort segment (Abort segment 1) planned for execution in original planned motion path received at step 602). As an example, while the planned motion path may define a path for the robotic manipulator 202 to move from a position 1 to a position 2 and stop, the updated planned motion path may define the path for the robotic manipulator to move from position 2 to position 3 and then stop movement of the robotic manipulator 202.

At step 614, the robotic controller 204, may validate the updated planned path received at step 612. In this regard, in some example embodiments, the robotic controller validates the updated planned motion path based on performing various validation checks (e.g. similar to validation checks as described at step 604). In some examples, the robotic controller 204 may validate the updated planned motion path by performing an acceleration check against limits and continuations between one or more path segments of the updated planned motion path.

Based on a successful validation or an un-successful validation of the updated planned motion path, at step 616, the method may move to step 618 or step 620. For example, if the updated planned motion path is an invalid path (e.g. sequence of path segments defined in the updated planned motion path is incorrect or in non-conformity with a desired motion type), the one or more PLCs (214-1, 214-2 ... 214-n) of the robotic controller 204 may initiate execution of the abort segment (e.g. abort segment 1). However, in response to successful validation of the updated planned motion path, at step 620, the one or more PLCs (214-1, 214-2 ... 214-n) may queue, in the command queue 222, the second path segment (e.g. Path segment 2) after the first path segment (Path segment 1) and an abort segment (abort segment 2) after the second path segment (Path segment 2) for execution by the robotic manipulator 202.

According to said example embodiments, the one or more PLCs (214-1, 214-2 ... 214-n) may queue, in the command queue 222, the second path segment (e.g. Path segment 2) after the first path segment (Path segment 1), to cause execution of the second path segment in response to execution of the first path segment. Similarly, the one or more PLCs (214-1, 214-2 ... 214-n) may queue, the abort segment after the second path segment to cause execution of the abort segment in response to execution of the second path segment. As described earlier, the abort segment herein, defines a path segment which upon execution results in aborting an operation of the robotic manipulator 202. Said differently, the abort segment defines a protocol based on which the joint of the robotic manipulator 202 moves before eventually stopping its movement (e.g. the joint reaches a 0 velocity, as illustrated in FIG. 4, see GR 408, abort segment between time instances T2->T3).

In accordance with said example embodiments, the robotic controller 204 may also initiate execution of the abort segment (Abort segment 1), in response to receiving an indication of an event. In some examples, the event may correspond to one of: an occurrence of a fault condition of a robotic manipulator, or an emergency condition, or a power failure associated with the robotic system 200.

According to various example embodiments described herein, the first path segment, the second path segment, and the abort segment comprises positional data points in time, indicative of positions to which the joint of the robotic manipulator is to be moved at respective instances of time. For instance, referring to FIG. 3, in some examples, the first path segment may comprise positional data points as, Starting point at time instance T0 [P0(T0)], End point at time instance T1 [P1(T1)], Starting velocity at time instance T0 [V0(T0)], End velocity at time instance T1 [V1(T1)]. Similarly, the abort segment may comprise positional data points as, starting point at time instance T1 [P1(T1)], End point at time instance T2 [P2(T1)], starting velocity at time instance T1 [V1(T1)], End velocity at time instance T2 0(T1).

According to some example embodiments, definition of path segments in the planned motion path and/or the updated planned motion path (e.g. the first path segment, the second path segment, and the abort segment) may also comprise a segment time indicative of a time for which a path of a path segment and/or an abort segment is to be executed, a segment length indicative of a path to be followed when executing the path segment and/or the abort segment, and a time step indicating an instance of time at which the path segment and/or the abort segment is to be executed. Based on these parameters defined in definition, the first path segment, the second path segment, and the abort segment are translated into joint positions to which the joint is to be moved to execute the motion of the robotic manipulator 202.

In accordance with various example embodiments described herein, a motion planner (i.e. the computational platform 206) for the robotic manipulator 202 plans a motion path that: (a) is comprised of positional data points in time and (b) conforms to the motion type of the robotic system 200 such as, (i) minimum execution time, (ii) shortest distance, (iii) limited velocity, (iv) constant velocity, (v) velocity matching, (v) limited acceleration, etc. In this regard, the motion path may be coordinated and collision free based on the kinematic model of the robotic manipulator 202. Further the motion path is composed of a sequential sequence of path segments and can be altered by the motion planner during motion by changing subsequent path segments prior to queueing in the command queue 222 maintained by the robotic controller 204.

Further, in accordance with said example embodiments, a path segment may correspond to a portion of a motion path that: (a) starts the motion path or succeeds a previous path segment, (b) follows the motion path, and (c) has an associated abort path segment which can be: (i) a continuation of associated path segment, (ii) a valid path segment, and/or (iii) a path segment that results in zero velocity at completion.

In accordance with various example embodiments described herein, a control method of the robotic system 200 executed by the one or more PLCs (214-1, 214-2 . . . 214-*n*) of the robotic controller 204, can comprise validating a path segment for at least one of: (i) a sequential path segment or start of motion path positional check against limits and continuations between path segments, (ii) a velocity check against limits and continuations between path segments, (iii) an acceleration check against limits and continuations between path segments, (iv) a complete path segment with valid abort path segment. Further, the method can comprise queuing a valid sequential path segment when: (i) there is no queued path segment or (ii) a previously queued path segment is an abort path segment. Further the method can comprise executing queued sequential path segment and temporarily queuing abort path segment when: (a) the previous path segment completes or (ii) there is no executing path segment at a scheduled execution time. Furthermore, the method can comprise executing the abort path segment when the path segment completes with no updated queue. Furthermore, the method can comprise stopping an execution of the executing path segment based on occurrence of an event, for example, a fault in the robotic manipulator 202, an emergency condition, a loss of communication between aspects of the robotic controller 204, or receiving commands to stop by one or more aspects of the robotic controller 204.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A robotic manipulator comprising:
a robotic controller comprising a programmable logic controller (PLC) configured to:
receive, a planned motion path comprising a first path segment to be executed by a joint of the robotic manipulator, wherein the first path segment is: associated with a path to be followed by the joint and queued before an abort segment associated with the first path segment and wherein the abort segment is indicative of a path segment that, in response to execution, results in aborting an operation of the joint of the robotic manipulator;
validate, the planned motion path based on an analysis of at least, the first path segment and the abort segment; and
in response to successful validation of the planned motion path, initiate, execution of the first path segment by the joint of the robotic manipulator.

2. The robotic manipulator of claim 1, wherein the PLC is configured to execute the abort segment in response to one of:
the execution of the first path segment or
receiving of an event at the PLC indicating a fault condition associated with the robotic manipulator.

3. The robotic manipulator of claim 1, wherein the PLC is configured to:
receive, while the planned motion path is under execution, an updated planned motion path comprising a second path segment that defines a path to be followed by the joint in response to execution of the first path segment of the planned motion path;
validate, the updated planned motion path based on an analysis of at least, the first path segment, the second path segment, and the abort segment;
in response to successful validation of the updated planned motion path, queue:
the second path segment after the first path segment to cause execution of the second path segment in response to execution of the first path segment and
a second abort segment after the second path segment to cause execution of the second abort segment, associated with the second path segment, in response to execution of the second path segment; and in response to un-successful validation of the updated planned motion path, initiate execution of the abort segment.

4. The robotic manipulator of claim 3, wherein the PLC receives, the planned motion path and the updated planned motion path from a robotic controller and wherein each of the first path segment, the second path segment, the abort segment, and the second abort segment, comprises positional data points in time, indicative of a plurality of positions to which the joint of the robotic manipulator is to be moved at respective instances of time.

5. The robotic manipulator of claim 3, wherein each of the first path segment, the second path segment, the abort segment, and the second abort segment, corresponds to positional data points comprising at least: a segment time, a segment length, and a time step, based on which the first path segment, the second path segment, and the abort segment are translated into joint positions to which the joint of the robotic manipulator is to be moved to execute the planned motion path.

6. The robotic manipulator of claim 3, wherein the updated planned motion path comprises a sequence of a plurality of path segments comprising at least, the first path segment, the second path segment, the abort segment, and the second abort segment, conforming to a motion type of the joint, and wherein the motion type is from amongst: constant velocity motion type, velocity matching motion type, limited acceleration motion type, minimum execution time motion type, shortest distance motion type, and a constant velocity motion type.

7. The robotic manipulator of claim 3, wherein the PLC is configured to initiate execution of any of the abort segment and the second abort segment, in response to receiving an indication of occurrence of an event, wherein the event corresponds to one of: a fault, an emergency condition, and a power failure, associated with the robotic manipulator.

8. The robotic manipulator of claim 3, wherein to validate at least one of: the planned motion path and the updated planned motion path, the PLC is configured to perform at least one of:

a velocity check, for the joint of the robotic manipulator based on a first motion type defining the planned motion path, wherein the first motion type is a constant velocity motion type;

an acceleration check, for the joint of the robotic manipulator based on a second motion type defining the planned motion path, wherein the second motion type is a limited acceleration motion type;

a missing data check, to identify occurrence of missing data points defined in at least one of the first path segment, the second path segment, and the abort segment from amongst a plurality of path segments of the planned motion path;

a path sequence check, to verify a sequence of path segments of a plurality of path segments and respective abort segments defined in the planned motion path; and a path validity check, to verify positional data points corresponding to at least one of the planned motion path and the updated planned motion path, to be a valid path.

9. A robotic system comprising:
a robotic manipulator;
a computational platform communicatively coupled to the robotic manipulator, the computational platform comprising:
  a processor;
  a path planning unit communicatively coupled to the processor, the path planning unit configured to:
    generate, a planned motion path comprising at least, a first path segment and an abort segment, wherein the first path segment is associated with a path to be followed by a joint of the robotic manipulator and queued before an abort segment associated to the first path segment and wherein the abort segment is indicative of a path segment that, in response to execution, results in aborting an operation of the robotic manipulator; and
    transmit, the planned motion path to at least one programmable controller (PLC) for execution;
a robotic controller communicatively coupled to the computational platform and the robotic manipulator, the robotic controller comprising a programmable logic controller (PLC) configured to:
  receive, from the computational platform, the planned motion path;
  validate, the planned motion path based on an analysis of at least, the first path segment and the abort segment of the planned motion path; and
  in response to successful validation of the planned motion path, initiate execution of the first path segment.

10. The robotic system of claim 9, wherein the computational platform is configured to:
generate, the planned motion path based on kinematic properties of the robotic manipulator and conforming to a motion type based on which the planned motion path is to be executed; and
during an execution of the planned motion path, alter, the planned motion path by modifying path segments of the planned motion path that are subsequent to the first path segment and are to be queued by the robotic controller for execution by the robotic manipulator.

11. The robotic system of claim 9, wherein the PLC is configured to execute the abort segment in response to:
the execution of the first path segment or
receiving an event indicating occurrence of a fault condition associated with the robotic manipulator.

12. The robotic system of claim 9, wherein the PLC is configured to:
receive, while the planned motion path is under execution, an updated planned motion path comprising a second path segment that defines a path to be followed by the joint in response to the execution of the first path segment of the planned motion path;
validate, the updated planned motion path based on an analysis of at least, the first path segment, the second path segment, and the abort segment; and
in response to successful validation of the updated planned motion path, queue:
  the second path segment after the first path segment to cause execution of the second path segment in response to execution of the first path segment and
  a second abort segment after the second path segment to cause execution of the second abort segment associated with the second path segment in response to execution of the second path segment; and in response to un-successful validation of the updated planned motion path, initiate, execution of the abort segment in response to execution of the first path segment.

13. The robotic system of claim 12, wherein the planned motion path defines a sequence of a plurality of path segments comprising at least, the first path segment, the second path segment, the abort segment, and the second abort segment, and wherein each path segment of the plurality of path segments comprises positional data points in time, indicative of a plurality of positions to which the joint of the robotic manipulator is to be moved, at respective instances of time.

14. The robotic system of claim 12, wherein the first path segment, the second path segment, the abort segment, and the second abort segment, of the planned motion path corresponds to positional data points comprising at least: a segment time, a segment length, and a time step, based on which the first path segment, the second path segment, and the abort segment are translated into joint positions to which the joint is to be moved to execute the planned motion path.

15. The robotic system of claim 12, wherein the planned motion path defines a sequence of a plurality of path segments comprising at least, the first path segment, the second path segment, the abort segment, and the second abort segment, defined to conform with a motion type of the joint of the robotic manipulator, and wherein the motion type is from amongst: constant velocity motion type, velocity matching motion type, limited acceleration motion type, minimum time motion type, and a constant velocity motion type.

16. A method comprising:
receiving, by a programmable logic controller (PLC), a planned motion path comprising a first path segment and an abort segment associated with the first path segment and temporarily queued after the first path segment, wherein the planned motion path is associated with a path to be followed by a joint of a robotic manipulator and the abort segment is indicative of a path segment that in response to execution results in aborting an operation of the robotic manipulator;

validating, the planned motion path based on an analysis of at least, the first path segment and the abort segment of the planned motion path; and
in response to successful validation of the planned motion path, initiating execution of the first path segment.

17. The method of claim 16 comprising, executing the abort segment in response to:
the execution of the first path segment or
receiving of an event indicating an occurrence of a fault condition of the robotic manipulator.

18. The method of claim 16 comprising:
receiving, by the PLC, while the planned motion path is under execution, an updated planned motion path comprising a second path segment that defines a path to be followed by the joint in response to the execution of the first path segment;
validating, by the PLC, the updated planned motion path based on analysis of at least, the first path segment, the second path segment, and the abort segment;
in response to successful validation of the updated planned motion path, queuing:
the second path segment after the first path segment, to cause execution of the second path segment in response to execution of the first path segment and
a second abort segment after the second path segment to cause execution of the second abort segment associated with the second path segment, in response to execution of the second path segment; and
in response to un-successful validation of the second path segment, initiating execution of the abort segment.

19. The method of claim 18, comprising initiating an execution of any of the abort segment and the second abort segment, in response to receiving an indication of occurrence of an event, wherein the event corresponds to one of: a fault, an emergency condition, a communication loss, and a power failure.

20. The method of claim 18, wherein each of the first path segment, the second path segment, the abort segment, and the second abort segment, comprises positional data points in time, indicative of a plurality of positions to which the joint of the robotic manipulator is to be moved at respective instances of time.

* * * * *